United States Patent [19]

Eggmann et al.

[11] 4,339,925
[45] Jul. 20, 1982

[54] METHOD AND APPARATUS FOR COOLING HOT GAS CASINGS

[75] Inventors: Jean Eggmann, Baden; Hans Graf, Untersiggenthal; Tadeusz Zaba, Ennetbaden, all of Switzerland

[73] Assignee: BBC Brown, Boveri & Company Limited, Switzerland

[21] Appl. No.: 55,808

[22] Filed: Jul. 9, 1979

[30] Foreign Application Priority Data

Aug. 3, 1978 [CH] Switzerland ............... 8262/78

[51] Int. Cl.³ .............................................. F02C 7/18
[52] U.S. Cl. ...................................... 60/757; 60/758; 60/760
[58] Field of Search ................ 60/757, 758, 759, 760, 60/266, 267, 260; 415/116, 178; 416/95

[56] References Cited

U.S. PATENT DOCUMENTS

| | | | |
|---|---|---|---|
| 2,958,194 | 11/1960 | Bayley | 60/760 |
| 2,973,937 | 3/1961 | Wolf | 416/95 |
| 3,570,241 | 3/1971 | Alexander | 60/757 |
| 3,777,484 | 12/1973 | Dibelius | 60/759 |
| 4,017,207 | 4/1977 | Bell | 415/117 |
| 4,064,300 | 12/1977 | Bhangu | 60/757 |
| 4,071,194 | 1/1978 | Eckert | 60/266 |

FOREIGN PATENT DOCUMENTS 379839  8/1964  Switzerland ................ 415/117

*Primary Examiner*—Douglas Hart
*Attorney, Agent, or Firm*—Burns, Doane, Swecker & Mathis

[57] ABSTRACT

A method and apparatus for cooling the hot gas casing of a gas turbine power plant is disclosed. The apparatus includes a shell which is spaced from but which encompasses the hot gas casing so as to form an air channel about the casing. A compressor provides a supply of cooling air which flows into the air channel through openings in the shell, and which air absorbs heat from the hot gas casing as it flows through the air channel.

4 Claims, 8 Drawing Figures

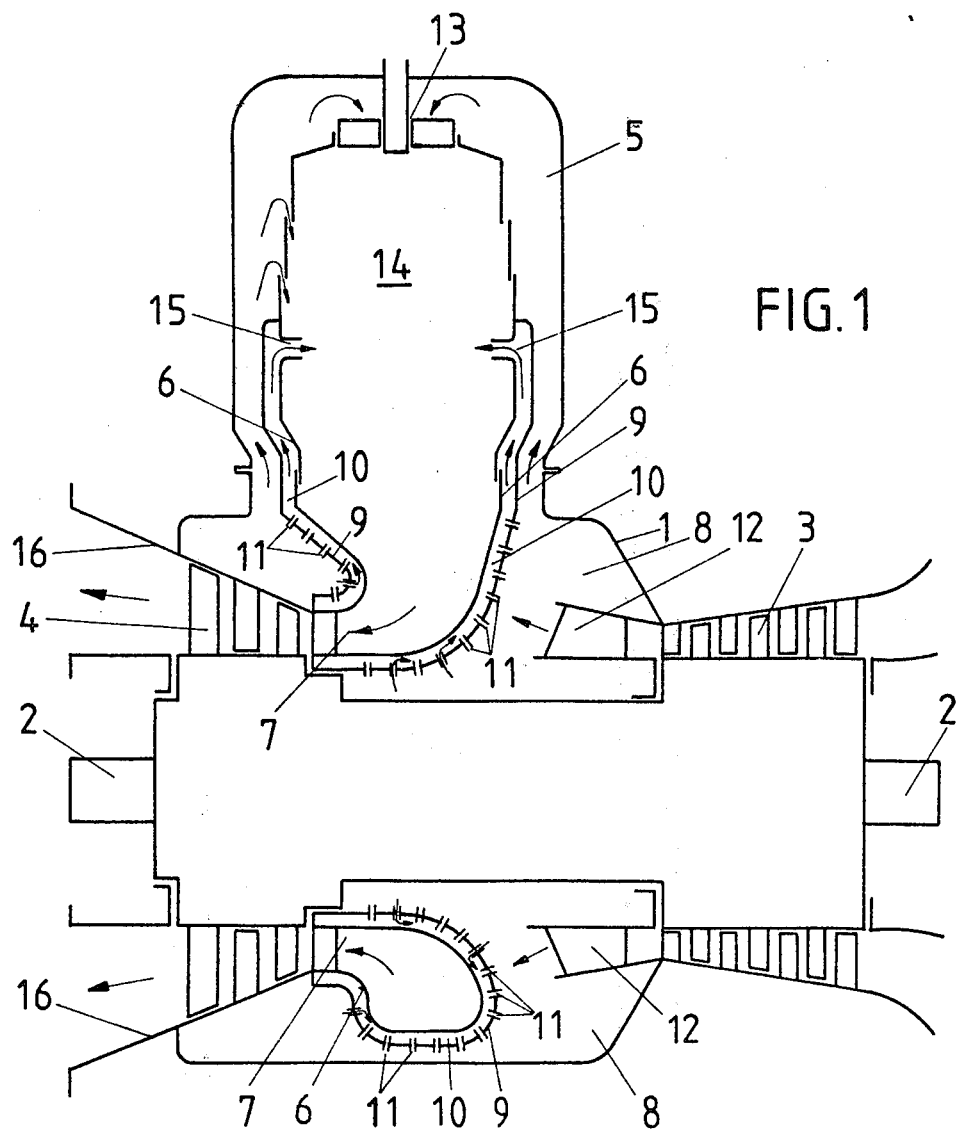

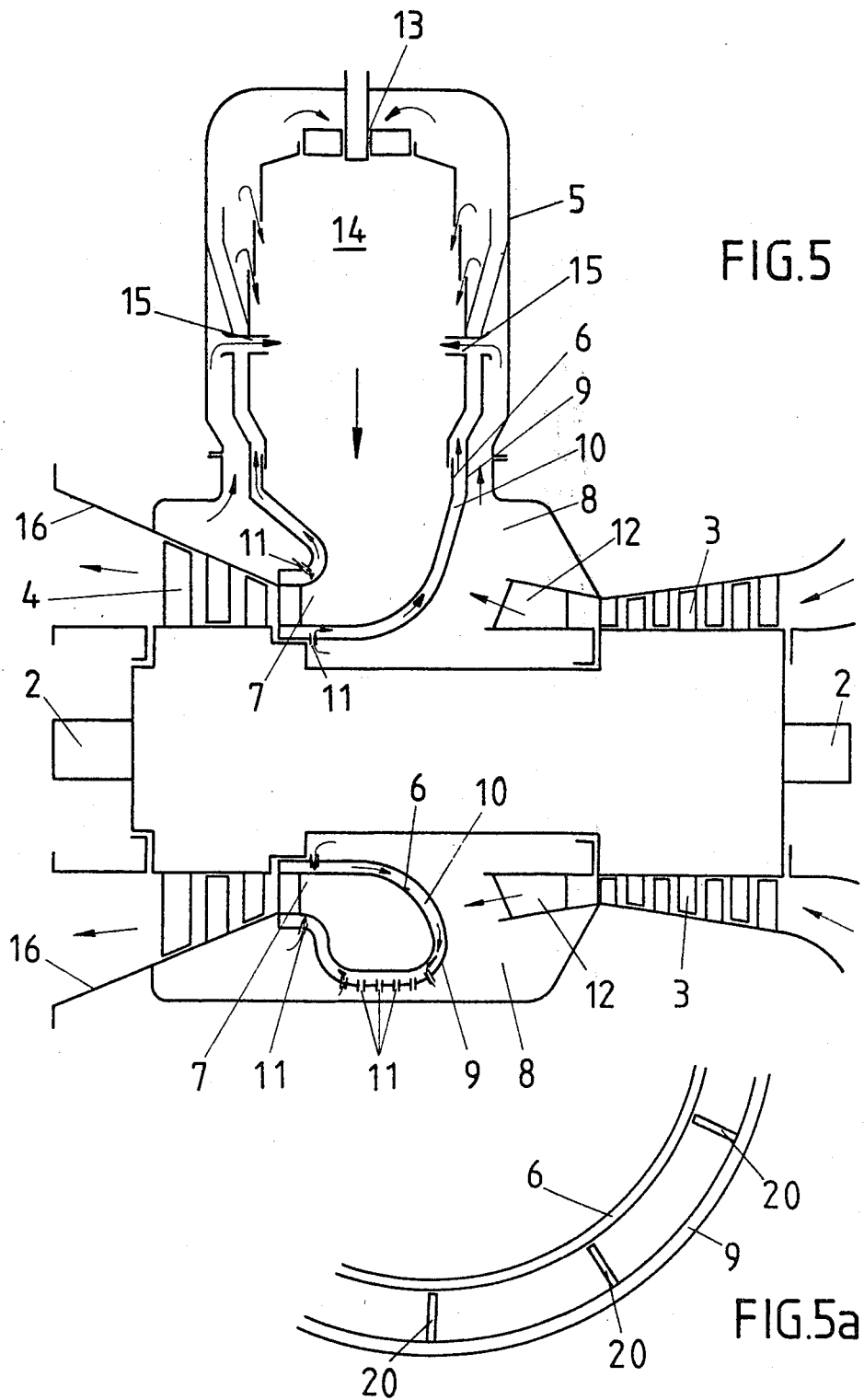

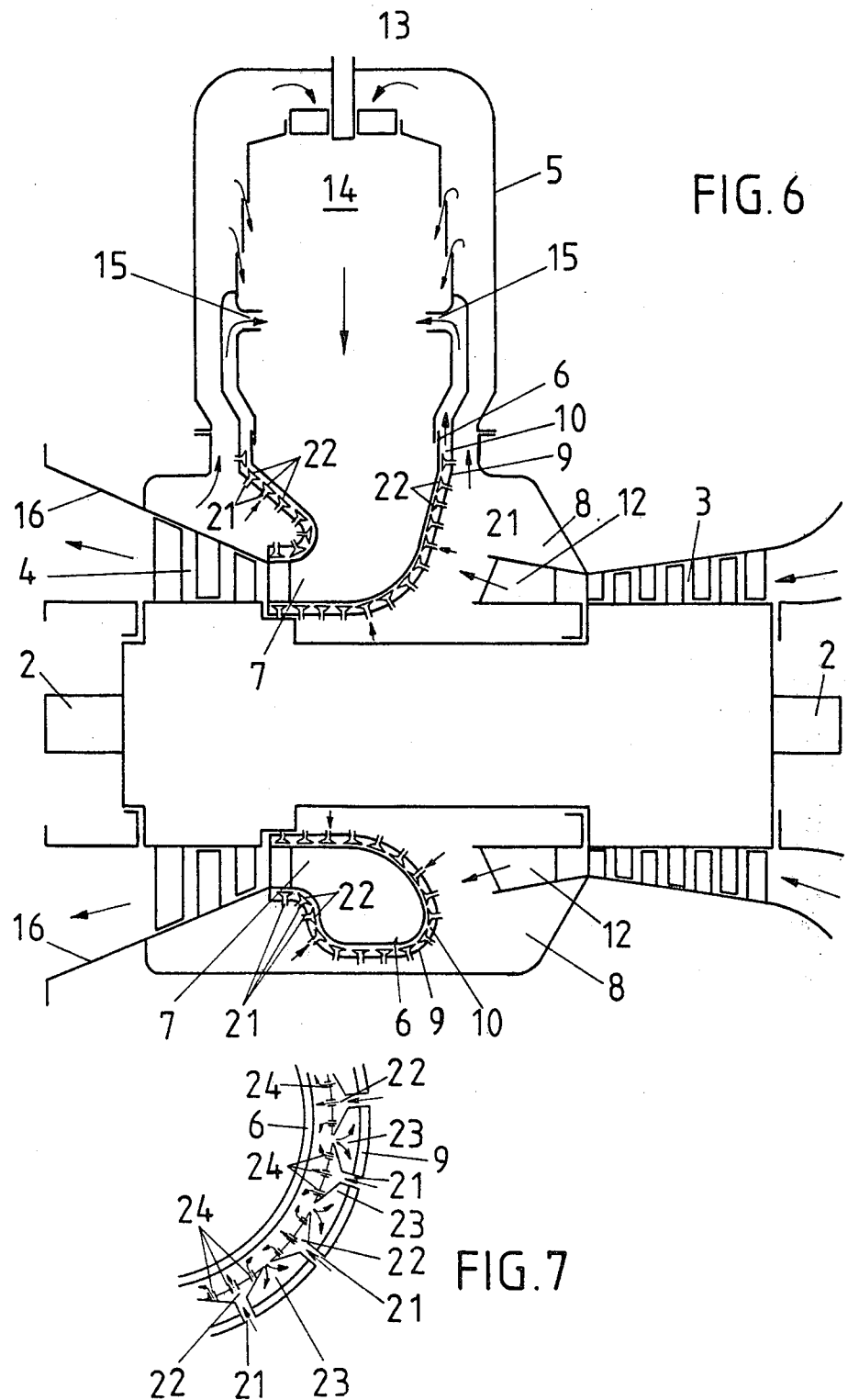

METHOD AND APPARATUS FOR COOLING HOT GAS CASINGS

BACKGROUND AND SUMMARY OF THE PRESENT INVENTION

The invention disclosed herein pertains generally to an apparatus and method for cooling the hot gas casings of combustion chambers and more particularly, the hot gas casings of the combustion chambers of gas turbine power plants.

A gas turbine power plant typically includes a gas turbine, an air compressor, and a combustion chamber. The combustion chamber usually includes a combustion space enclosed by a hot gas casing. The gas turbine, the compressor, and the combustion chamber are usually enclosed in a housing. In operation, the gas turbine is supplied with hot gases flowing from the combustion chamber. In the case of prior art gas turbine power plants compressed air supplied by the compressor flows into the combustion chamber through a space located intermediate the hot gas casing and the power plant housing. Because this compressed air has a lower temperature than the surface of the hot gas casing, the air absorbs heat during its transit through the intermediate space. In this fashion, the hot gas casings of prior art gas turbine power plants are cooled by the compressed air supplied by an air compressor. This is disclosed, for example, in Swiss Pat. No. 284 190.

The method and apparatus used to cool the hot gas casings of prior art gas turbine power plants leads to a nonuniform flow of cooling compressed air over these casings. This nonuniform flow produces quite nonuniform casing wall temperatures which leads to thermal wall stresses, particularly when the turbine inlet temperatures are relatively high. Such thermal stresses can lead to cracks in hot gas casings. These thermal stresses and cracks are particularly evident in the hot gas casings of gas turbine power plants having one or more combustion chambers which are external to the power plant housing.

Accordingly, it is an object of the present invention to cool the hot gas casings of the combustion chambers of gas turbine power plants more uniformly in order to avoid the thermal stresses and cracks produced by non-uniform cooling.

A further object of the present invention is to be able to regulate the cooling of the hot gas casings according to the requirements of the situation.

Apparatus for uniformly cooling the hot gas casing of the combustion chamber of a gas turbine power plant, according to the present invention, includes an outer shell which encircles the hot gas casing to form a cooling air channel between the casing and the shell. This outer shell includes air inlet openings to permit cooling air from an air compressor to enter the cooling air channel. The cooling air channel terminates at a combustion air inlet of the hot gas casing.

Compressed air from the air compressor impinges like a jet on the hot gas casing to produce intense cooling. By appropriately adjusting the air inlet openings in the outer shell, as well as the distance of the outer shell from the hot gas casing, the cooling effect can be regulated according to the requirements of the situation. The cooling air is ultimately delivered to a combustion space of the combustion chamber either by being mixed with a primary air source flowing into the combustion space through a primary combustion air inlet, or by flowing into the combustion space through secondary air inlet nozzles.

A preferred embodiment of the present invention employs an optimum number of cooling air inlet openings in the outer shell, i.e., a number determined by the actual turbine inlet temperature prevailing on the inside surface of the hot gas casing.

A further preferred embodiment of the present invention includes the use of air ducts in the cooling air inlet openings. The use of such air ducts results in a uniform distribution of cooling air over the surface of the hot gas casing. The use of such ducts also reduces the possibility that the cooling air stream will be deflected by air flowing off the surface of the hot gas casing, and provides for a physical separation of the cooling air supply from the flow off.

Yet another preferred embodiment of the present invention includes the use of baffles in the cooling air channel for conducting the cool air between the outer shell and the hot gas casing. The use of baffles produces not only local baffle cooling but also film cooling because the cooling air is forced into intimate contact with the outside surface of the hot gas casing as it flows from baffle to baffle.

Yet a further preferred embodiment of the present invention includes the use of secondary air inlet nozzles arranged over the surface of the hot gas casing in order to pass cooling air directly from the cooling air channel into the combustion space. The relatively high pressure of the cooling air injected into the combustion space through the secondary air nozzles permits an increase in the pressure drop across the combustion chamber. In addition the use of the secondary nozzles imparts a relatively high velocity to the cooling air flowing through these nozzles and consequently produces a better mixing of the cooling air with the air entering the combustion space through the primary combustion air inlet.

Yet still another preferred embodiment of the present invention includes a flow restrictor placed between the outer shell and the power plant housing in the path of the air flowing directly from the air compressor to the primary combustion air inlet. In use, such a restrictor produces an increase in the velocity of that portion of the air stream not used for cooling. In addition, such a restrictor acts as an ejector for the cooling air in the cooling air channel, sucking cooling air through the space between the hot gas casing and the outer shell with relatively low flow losses.

Yet still a further preferred embodiment of the present invention includes openings in the hot gas casing through which cooling air may enter so as to produce additional film cooling on the inside walls of the hot gas casing.

BRIEF DESCRIPTION OF THE DRAWINGS

Preferred embodiments of apparatus according to the present invention are described with reference to the accompanying drawings wherein like members bear like reference numerals and wherein:

FIG. 1 is a longitudinal view in cross-section of a gas turbine power plant having a hot gas casing and an outer shell, according to the present invention;

FIG. 2 is an enlarged, cross-sectional view of a cooling air channel encircling a hot gas casing, with air inlet openings in the surface of the outer shell and the hot gas casing;

FIG. 3, a view similar to FIG. 2, shows air inlet ducts in the cooling air inlet openings in the outer shell;

FIG. 5, a view similar to FIG. 1, shows air inlet ducts in the portion of the cooling air channel near the bottom of the power plant, to produce baffle cooling;

FIG. 5a is an enlarged cross-sectional view of a cooling air channel having baffles arranged between the hot gas casing and the outer shell;

FIG. 6, a view similar to FIG. 1, shows air separators in the air inlet openings in the surface of the outer shell; and FIG. 7 is an enlarged cross-sectional view of the air separators shown in FIG. 6.

DETAILED DESCRIPTION OF THE PREFERRED EMBODIMENTS

Figure 4:
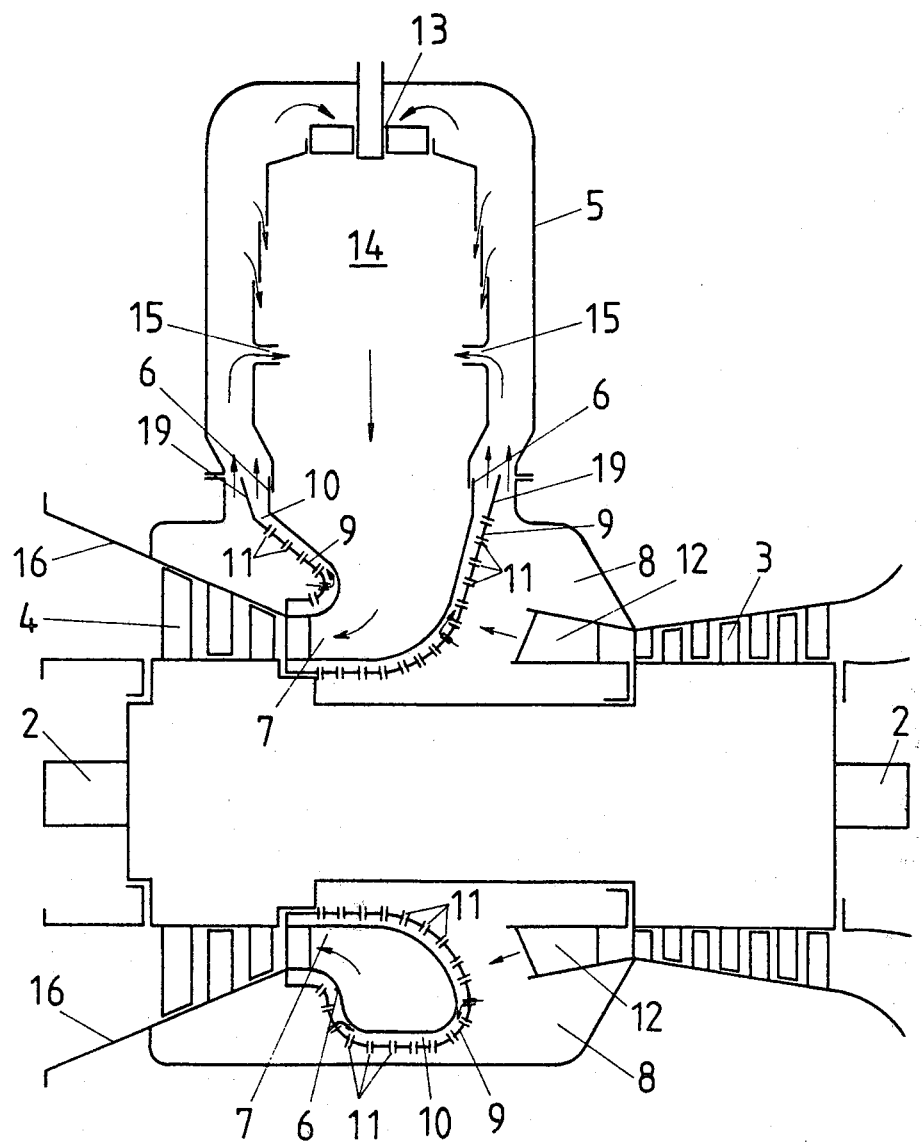
FIG. 4, a view similar to FIG. 1, shows a restrictor placed between the outer shell and the power plant housing.

With reference to FIG. 1, a gas turbine power plant according to the present invention includes a power plant housing 1 in which a compressor 3 and a gas turbine 4 are arranged on a common shaft 2. Also contained in the housing 1 is a combustion chamber 5 encircling a combustion space 14. Hot gases are supplied by the combustion chamber 5 to the turbine 4 through a hot gas casing 6 and a turbine inlet 7. An arrow in FIG. 1 shows the direction of the flow of the hot gases from the combustion chamber 5, through the turbine inlet 7, to the gas turbine 4.

Between the compressor 3 and the combustion chamber 5 is an intermediate space 8 bounded on one side by the housing 1. The hot gas casing 6 is enclosed by an outer shell 9 which also bounds the space 8. The space between the hot gas casing 6 and the outer shell 9 serves as a cooling air channel 10 through which air may flow to cool the hot gas casing 6. The outer shell 9 is provided with cooling air inlet openings 11.

When the gas turbine power plant is in operation, compressed air from the compressor 3 flows through an air channel 12 into the intermediate space 8. A portion of this compressed air flows as primary air through a primary combustion air inlet 13 into the combustion space 14 of the combustion chamber 5. The remaining portion of the compressed air serves as cooling air which flows through the cooling air inlet openings 11 into the cooling air channel 10. This cooling air flows over the outer surface of the hot gas casing 6 and in the process absorbs heat from this surface. The cooling air then flows through several combustion chamber secondary air inlets 15 where it is used as secondary air which is mixed with the hot gas in the combustion space 14. The hot gas flows through the turbine inlet 7 to the gas turbine 4, expands as it flows across the turbine, and then flows out of the turbine through an exhaust gas stack 16.

A preferred embodiment of a gas turbine power plant according to the present invention includes a number of small air inlet openings in the hot gas casing 6. With reference to FIG. 2, the part of the hot gas casing 6 which is to be cooled is provided with openings 17 through which the cooling air from the cooling air channel 10 can enter and be mixed directly with the hot gas in the turbine inlet nozzle 7. In this manner, the inner surface of the hot gas casing 6 is exposed to a film cooling.

In order to prevent disturbances to the cooling air flow in channel 10 by air flowing off from the hot gas casing 6, cooling air ducts 18 may be inserted into the cooling air inlet openings 11 of outer shell 9, as shown in FIG. 3. The ducts extend through air inlet openings 11 to a point close to the outer surface of the hot gas casing 6. The presence of these ducts results in a baffle cooling of hot gas casing 6. Furthermore, sufficient space is provided between the individual cool air ducts 18 in order to allow the cooling air to flow off unimpeded after cooling the hot gas casing 6, and without affecting the baffle cooling.

In another preferred embodiment of a gas turbine power plant, according to the present invention, cooling air from the cooling air channel 10 is supplied directly to the combustion space 14 of combustion chamber 5 through the primary combustion air inlet 13 as well as through secondary air inlets. With reference to FIG. 4, the cooling air in air channel 10, after flowing over hot gas casing 6, flows into the combustion space 14 through secondary air inlet nozzles 15 as well as through the primary combustion air inlet 13. In addition a restrictor 19 is provided between the housing 1 and the hot gas casing 6 at the outlet of the cooling air from the cooling air channel 10. The presence of the restrictor 19 causes the air flowing out from the intermediate space 8 to acquire a higher flow velocity than would exist in the absence of the restrictor. In addition, restrictor 19 acts as an ejector for the air flowing into the cooling air channel 10. Thus, the cooling air is more readily exhausted from the cooling air channel 10 which increases the circulation velocity of the cooling air and accordingly improves the cooling effect.

Yet another preferred embodiment of a gas turbine power plant according to the present invention has an improved cooling capability because it employs a mixture of baffle and convection cooling. With reference to FIG. 5a, baffles 20 force most of the cooling air in the cooling air channel 10 to flow over the entire outer surface of the hot gas casing 6 in intimate contact with this surface. With reference to FIG. 5, the lower portions of the hot gas casing 6, where the convective cooling is insufficient, may be provided with additional baffle cooling by providing the cooling air inlet openings 11 both with as well as without cooling air ducts 18.

Still another preferred embodiment of the present invention, in order to achieve a more effective separation of the air flowing into channel 10 from the air flowing out, employs air separators. With reference to FIGS. 6 and 7, these air separators include small cooling air tubes 21 arranged in the outer shell 9. Each of these air tubes 21 leads to an enlarged chamber 22 which is enclosed, and separated from the hot gas casing, by a perforated surface. Thus, the cooling air flows through the small cooling air tubes 21 into the chambers 22. Then the cooling air flows through the openings in the perforated surfaces enclosing these chambers, which surfaces are arranged close to the outer surface of the hot gas casing 6. Since spaces 23 are always provided and arranged between the small cooling air tubes 21 and behind the chambers 22, the cooling air flowing off from the hot gas casing 6 can flow into these intermediate spaces and from there be passed to combustion space 14.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for cooling a hot gas casing of a gas turbine power plant comprising:
   a combustion chamber enclosing a combustion space;
   a hot gas casing connected downstream of said combustion chamber;
   guide means for guiding a stream of cooling air over an outer surface portion of said hot gas casing;
   a compressor for supplying cooling air to said guide means;
   a gas turbine which receives hot gas from said combustion chamber, said combustion chamber being fixed with respect to the gas turbine, said compressor and said gas turbine being mounted on a common shaft;
   said guide means including
      a shell which is spaced from and encompasses said hot gas casing to form a channel between the casing and the shell,
      openings in the surface of the shell to permit cooling air to enter said channel,
      separation means for separating air flowing into the channel from air flowing off the hot gas casing; and
      said hot gas casing including means for inducing a film cooling of an inner surface portion of said hot gas casing.

2. Apparatus in accordance with claim 1 wherein said separation means includes:
   at least one tube which extends through an opening in the surface of the shell to the interior of the air channel; and
   a perforated surface enclosing a space adjacent to said tube and within said channel.

3. Apparatus for cooling a hot gas casing of a gas turbine power plant comprising:
   a combustion chamber enclosing a combustion space;
   a hot gas casing connected downstream of said combustion chamber;
   guide means for guiding a stream of cooling air over an outer surface portion of said hot gas casing;
   a compressor for supplying cooling air to said guide means;
   a gas turbine which receives hot gas from said combustion chamber, said combustion chamber being fixed with respect to the gas turbine, said compressor and said gas turbine being mounted on a common shaft;
   said guide means including
      a shell which is spaced from and encompasses said hot gas casing to form a channel between the casing and the shell,
      openings in the surface of the shell to permit cooling air to enter said channel;
   said hot gas casing including means for inducing a film cooling of an inner surface portion of said hot gas casing;
   a housing enclosing said combustion chamber and forming a primary combustion air inlet passage between the housing and the combustion chamber;
   an outlet of said channel communicating with the primary air inlet passage; and
   a flow restrictor arranged between said housing and said hot gas casing at the outlet of said channel.

4. Apparatus for cooling a hot gas casing of a combustion chamber comprising:
   a shaft;
   a compressor mounted on said shaft;
   a combustion chamber enclosing a combustion space;
   a housing enclosing said combustion chamber;
   a gas turbine, also mounted on said shaft, which receives hot gas from said combustion chamber, said combustion chamber being fixed with respect to said gas turbine;
   a hot gas casing connected downstream of said combustion chamber, said hot gas casing including means for inducing a film cooling of an inner surface portion of said hot gas casing, said combustion chamber having a primary combustion air inlet through which cooling air supplied by the compressor may enter the combustion space; and
   guide means for guiding a stream of said cooling air over an outer surface portion of said hot gas casing,
   said guide means including
      a shell which is spaced from and encompasses said hot gas casing to form a channel between the casing and the shell,
      an outlet of said channel,
      a flow restrictor arranged between said housing and said hot gas casing at the outlet of said channel,
      openings in the surface of the shell to permit cooling air to enter the interior of said channel, said cooling air being supplied to said air channel through the openings in the surface of the shell,
      separation means for separating air flowing into the channel from air flowing off the hot gas casing, said separation means including at least one tube which extends through one of the openings in the surface of the shell to the interior of the air channel and a perforated surface enclosing a space adjacent to said tube and within said channel, and
      at least one additional air inlet through which air flowing out of said channel may enter the combustion space.

* * * * *